(12) United States Patent
Kahan

(10) Patent No.: US 7,522,776 B2
(45) Date of Patent: *Apr. 21, 2009

(54) DIGITAL VIDEO MEDIA DUPLICATION OR TRANSMISSION QUALITY MEASUREMENT

(75) Inventor: Joseph M. Kahan, Houston, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/105,678

(22) Filed: Apr. 18, 2008

(65) Prior Publication Data

US 2008/0211917 A1    Sep. 4, 2008

Related U.S. Application Data

(63) Continuation of application No. 10/994,040, filed on Nov. 19, 2004, now Pat. No. 7,394,940.

(51) Int. Cl.
G06K 9/36 (2006.01)
G06K 9/46 (2006.01)

(52) U.S. Cl. ............... 382/233; 382/236; 382/250; 382/251; 382/190; 382/305; 375/240.01; 375/240.18

(58) Field of Classification Search ......... 382/232, 382/233, 236, 238, 240, 243, 245, 246, 250, 382/251, 253, 190, 305; 375/240.04, 240.1, 375/240.12, 240.18, 240.28, 240.17; 348/565, 348/498, 180
See application file for complete search history.

(56) References Cited

U.S. PATENT DOCUMENTS

| | | | |
|---|---|---|---|
| 5,313,280 A | 5/1994 | Straus | |
| 5,329,379 A | 7/1994 | Rodriguez et al. | |
| 5,446,492 A | 8/1995 | Wolf et al. | |
| 5,818,520 A | 10/1998 | Janko et al. | |
| 5,818,535 A * | 10/1998 | Asnis et al. | 348/416.1 |
| 6,055,015 A | 4/2000 | Edwards | |
| 6,057,882 A | 5/2000 | Van den Branden Lambrecht et al. | |
| 6,141,042 A | 10/2000 | Martinelli et al. | |
| 6,181,823 B1 * | 1/2001 | Takahashi | 382/232 |
| 6,192,079 B1 * | 2/2001 | Sharma et al. | 375/240.16 |
| 6,310,645 B1 | 10/2001 | Lapushin et al. | |
| 6,456,591 B1 | 9/2002 | Mishra | |
| 6,496,221 B1 | 12/2002 | Wolf et al. | |
| 6,532,541 B1 * | 3/2003 | Chang et al. | 713/176 |
| 6,549,757 B1 | 4/2003 | Masse et al. | |
| 6,665,271 B1 | 12/2003 | Thomas et al. | |
| 7,359,439 B1 * | 4/2008 | Conover | 375/240.12 |
| 2001/0022852 A1 | 9/2001 | Gicquel et al. | |
| 2003/0011679 A1 | 1/2003 | Jung et al. | |
| 2003/0046032 A1 | 3/2003 | Puthiyedath | |
| 2003/0081124 A1 | 5/2003 | Balasubrawmanian et al. | |

* cited by examiner

Primary Examiner—Matthew C Bella
Assistant Examiner—Ali Bayat
(74) Attorney, Agent, or Firm—Gibb I.P. Law Firm, LLC; Derek S. Jennings

(57) ABSTRACT

A system and method for measuring video quality of a video image, wherein the system comprises a source device comprising an original video image; a receiver comprising a received video image; a storage device adapted to store video images from the source device and the receiver; a decoder connected to the receiver, wherein the decoder is adapted to compare display attributes of the received video image with creation attributes of the original video image; and a processor adapted to attribute an objective standard to the received video image based on the comparison between the display attributes and the creation attributes, wherein the objective standard comprises a video pixel size component, a video motion rating component, a video clarity rating component, and a pixel color rating component.

6 Claims, 4 Drawing Sheets

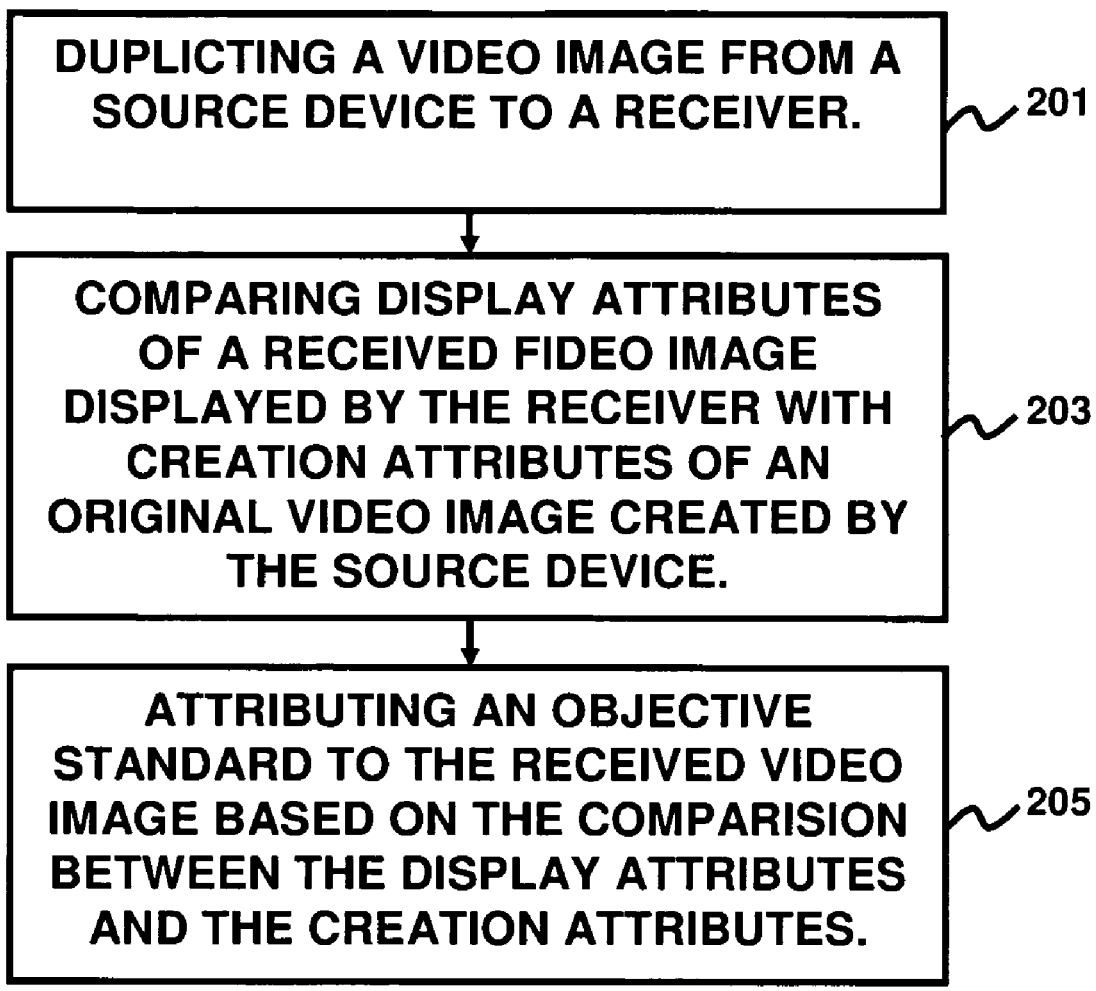

DIGITAL VIDEO MEDIA DUPLICATION OR TRANSMISSION QUALITY MEASUREMENT

CROSS-REFERENCE TO RELATED APPLICATIONS

This application is a Continuation of U.S. application Ser. No. 10/994,040 filed Nov. 19, 2004, the complete disclosure of which, in its entirety, is herein incorporated by reference.

BACKGROUND OF THE INVENTION

1. Field of the Invention

The embodiments of the invention generally relate to digital video, and more particularly to systems and methods for digital video duplication and transmission enhancement.

2. Description of the Related Art

Generally, conventional techniques in digital video media technology do not provide a viable manner of measuring the quality of a digital video media duplication or transmission for display. If a media file is used on a compact disk (CD), digital video disk (DVD), or transported via a network there is generally not a viable manner of accurately measuring the video image against its original source in order to provide an ample transmission or duplication quality video image. Without this measurement the industry is left up to individual opinions as to what looks good or bad.

Current known standards generally deal solely with how video media should be packaged, encoded, compressed, or transported. Specifically, current known methods tend to measure transport quality and assume that if packets (video) are delivered, then all is well. However, there remains a need for a technique that measures the digital video media quality after it has been delivered from a source device to a destination device (i.e., measuring the initial input video against the displayable output of the video).

SUMMARY OF THE INVENTION

In view of the foregoing, an embodiment of the invention provides a system for measuring video quality of a video image, wherein the system comprises a source device comprising an original video image; a receiver comprising a received video image; a storage device adapted to store video images from the source device and the receiver; a decoder connected to the receiver, wherein the decoder is adapted to compare display attributes of the received video image with creation attributes of the original video image; and a processor adapted to attribute an objective standard to the received video image based on the comparison between the display attributes and the creation attributes, wherein the objective standard comprises a video pixel size component, a video motion rating component, a video clarity rating component, and a pixel color rating component. In one embodiment, the receiver comprises a display console.

The decoder comprises a first component adapted to create an original single motion frame comprising original pixels for the original video image; a second component adapted to receive single motion frame comprising received pixels for the received video image; and a comparator adapted to compare the original single motion frame with the received single motion frame, wherein the comparator is adapted to compare an original pixel color of the original single motion frame with a received pixel color of the received single motion frame, and wherein the comparator is adapted to compare a digital representation of the original pixel color with a digital representation of the received pixel color.

The system further comprises a pointer adapted to select a group of contiguous original pixels in the original single motion frame and to select a corresponding group of contiguous received pixels in the received single motion frame, wherein the comparator is adapted to compare the selected group of contiguous original pixels in the original single motion frame with the selected corresponding group of contiguous received pixels in the received single motion frame, wherein the group of contiguous original pixels comprise a group of nine contiguous original pixels arranged in a 3×3 square configuration, and wherein the corresponding group of contiguous received pixels comprise a group of nine contiguous original pixels arranged in a 3×3 square configuration.

Another embodiment of the invention provides a method of measuring video quality, wherein the method comprises duplicating a video image from a source device to a receiver; comparing display attributes of a received video image displayed by the receiver with creation attributes of an original video image created by the source device; and attributing an objective standard to the received video image based on the comparison between the display attributes and the creation attributes, wherein in the attributing process, the objective standard comprises a video pixel size component, a video motion rating component, a video clarity rating component, and a pixel color rating component. In one embodiment, the receiver comprises a display console.

The comparing process comprises creating an original single motion frame comprising original pixels for the original video image; creating a received single motion frame comprising received pixels for the received video image; and comparing the original single motion frame with the received single motion frame. The method further comprises selecting a group of contiguous original pixels in the original single motion frame; selecting a corresponding group of contiguous received pixels in the received single motion frame; and comparing the selected group of contiguous original pixels in the original single motion frame with the selected corresponding group of contiguous received pixels in the received single motion frame, wherein the group of contiguous original pixels comprise a group of nine contiguous original pixels arranged in a 3×3 square configuration, and wherein the corresponding group of contiguous received pixels comprise a group of nine contiguous original pixels arranged in a 3×3 square configuration. The method also comprises comparing a color of the original pixels with a color of a corresponding the received pixels.

Another aspect of the invention provides a program storage device readable by machine, tangibly embodying a program of instructions executable by the machine to perform a method of measuring video quality, wherein the method comprises duplicating a video image from a source device to a receiver; comparing display attributes of a received video image displayed by the receiver with creation attributes of an original video image created by the source device; and attributing an objective standard to the received video image based on the comparison between the display attributes and the creation attributes.

These and other aspects of the embodiments of the invention will be better appreciated and understood when considered in conjunction with the following description and the accompanying drawings. It should be understood, however, that the following descriptions, while indicating preferred embodiments of the invention and numerous specific details thereof, are given by way of illustration and not of limitation. Many changes and modifications may be made within the scope of the embodiments of the invention without departing from the spirit thereof, and the embodiments of the invention include all such modifications.

BRIEF DESCRIPTION OF THE DRAWINGS

The embodiments of the invention will be better understood from the following detailed description with reference to the drawings, in which:

FIG. 2 is a flow diagram illustrating a preferred method according to an embodiment of the invention.

DETAILED DESCRIPTION OF PREFERRED EMBODIMENTS OF THE INVENTION

Figure 1A:
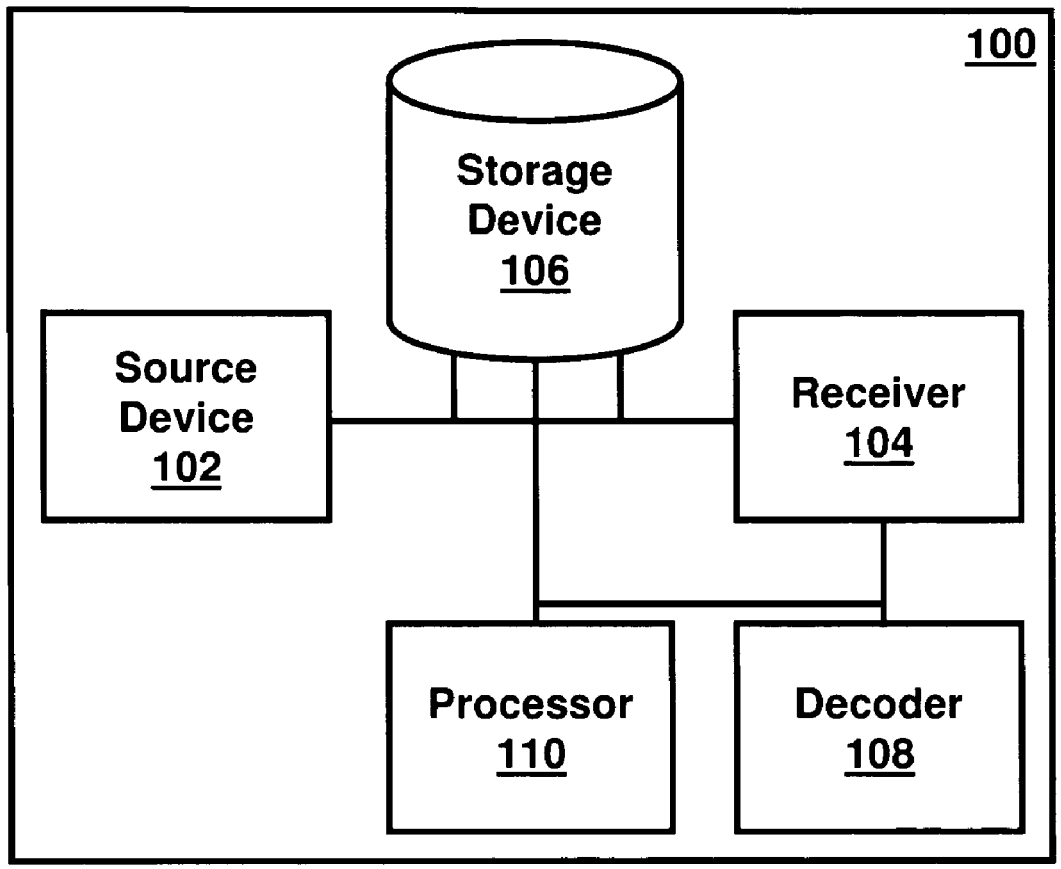
FIG. 1(A) is a schematic diagram of a system for measuring video quality of a video image according to an embodiment of the invention.

The embodiments of the invention and the various features and advantageous details thereof are explained more fully with reference to the non-limiting embodiments that are illustrated in the accompanying drawings and detailed in the following description. It should be noted that the features illustrated in the drawings are not necessarily drawn to scale. Descriptions of well-known components and processing techniques are omitted so as to not unnecessarily obscure the embodiments of the invention. The examples used herein are intended merely to facilitate an understanding of ways in which the embodiments of the invention may be practiced and to further enable those of skill in the art to practice the embodiments of the invention. Accordingly, the examples should not be construed as limiting the scope of the embodiments of the invention.

As mentioned, there remains a need for a technique that measures the digital video media quality after it has been delivered from a source device to a destination device (i.e., measuring the initial input video against the displayable output of the video). The source device may reside on the display device or the source video from the source device may be transmitted to the display device in some manner (i.e., transferring of files such as via CD or DVD or wireless transmission, etc.). The embodiments of the invention address this need by providing an accurate way to compare various video products, measuring a successful transport, and understanding the effects of performance capabilities. Referring now to the drawings and more particularly to FIGS. 1(A) through 3 where similar reference characters denote corresponding features consistently throughout the figures, there are shown preferred embodiments of the invention.

By measuring a few key elements about a video content (i.e., from the original source video against what is actually being displayed or viewed), a scoring method, provided by an embodiment of the invention, can be applied. The embodiments of the invention provide an objective transmission quality score for a given video content. The embodiments of the invention provide for a measurement score, not a pass/fail criteria or method to current lower score measurements. This score is based on the concept that all video content should be able to be displayed on a computer desktop and/or video monitor in full screen. Understanding that in all cases this is not possible, levels or scores are established to properly weigh the contents value. This scoring method can also be used to weigh one encoded format against another to select the best method to encode the video content. The embodiments of the invention compare five such key elements including pixel, video frame rate, clarity, display units color capability, and video bit rate. Accordingly, transport elements are not a factor even though bit rate is. In the context of the embodiments of the invention, the bit rate measurement only provides a method to measure efficiency in the video compression being used.

Measuring video content can be performed in several ways depending on how the decoder will extract the information. A first way is via a stream and play, and a second way is via a download and play. The encoded video content is measured as an average of a 10:1 over the length of the encoded content. For example, a 10 minute video file or stream is measured and an average is taken for 1 minute worth of content. This value is measured, in the case of streaming, while it is transmitting to the worst case decoder scenario. In either case, a worst case scenario is established by reviewing the decoding devices capability and network resources.

FIG. 1(A) illustrates a block diagram of a system 100 for measuring video quality of a video image according to an embodiment of the invention, wherein the system 100 comprises a source device 102 comprising an original video image; a receiver 104 comprising a received video image; a storage device 106 adapted to store video images from the source device 102 and the receiver 104; a decoder 108 connected to the receiver 104, wherein the decoder 108 is adapted to compare display attributes of the received video image with creation attributes of the original video image; and a processor 110 adapted to attribute an objective standard to the received video image based on the comparison between the display attributes and the creation attributes, wherein the objective standard comprises a video pixel size component, a video motion rating component, a video clarity rating component, and a pixel color rating component.

In one embodiment, the source device 102 comprises a CD, video CD (VCD), super VCD (SVCD), DVD, computer hard drive, VCR, digital recorder. In one embodiment, the receiver 104 comprises a display console, such as a television, analog display monitor, high definition television, digital display on a computer, medical display unit, car display panel, etc. In one embodiment, the original video image may be transferred to the receiver 104 using satellite communications, the Internet, wireless transmission, digital cable, analog cable, etc.

Figure 1B:
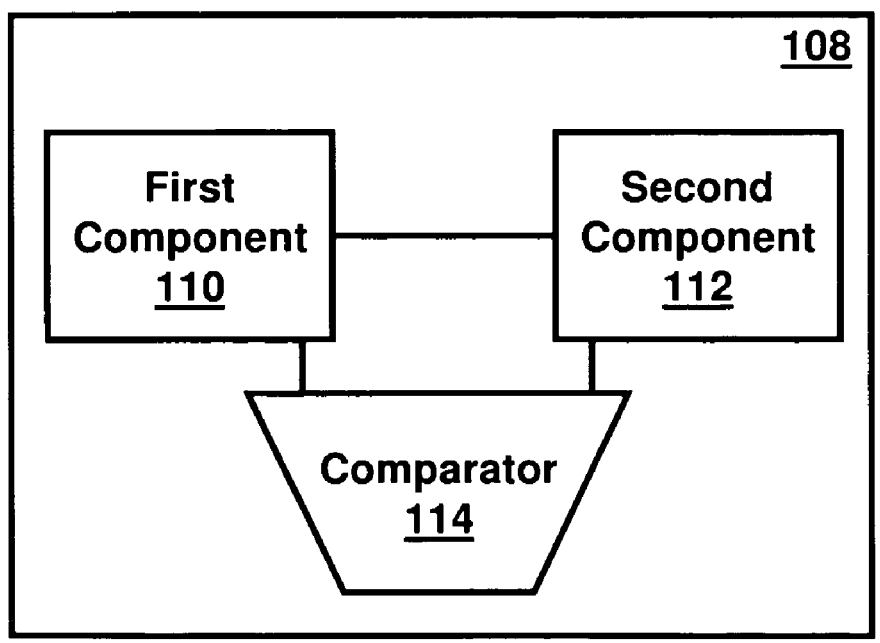
FIG. 1(B) is a schematic diagram of the decoder of FIG. 1(A) according to an embodiment of the invention.

As shown in FIG. 1(B), the decoder 108 comprises a first component 110 adapted to create an original single motion frame comprising original pixels for the original video image; a second component 112 adapted to receive single motion frame comprising received pixels for the received video image; and a comparator 114 adapted to compare the original single motion frame with the received single motion frame, wherein the comparator 114 is adapted to compare an original pixel color of the original single motion frame with a received pixel color of the received single motion frame, and wherein the comparator is adapted to compare a digital representation of the original pixel color with a digital representation of the received pixel color.

Figure 1C:
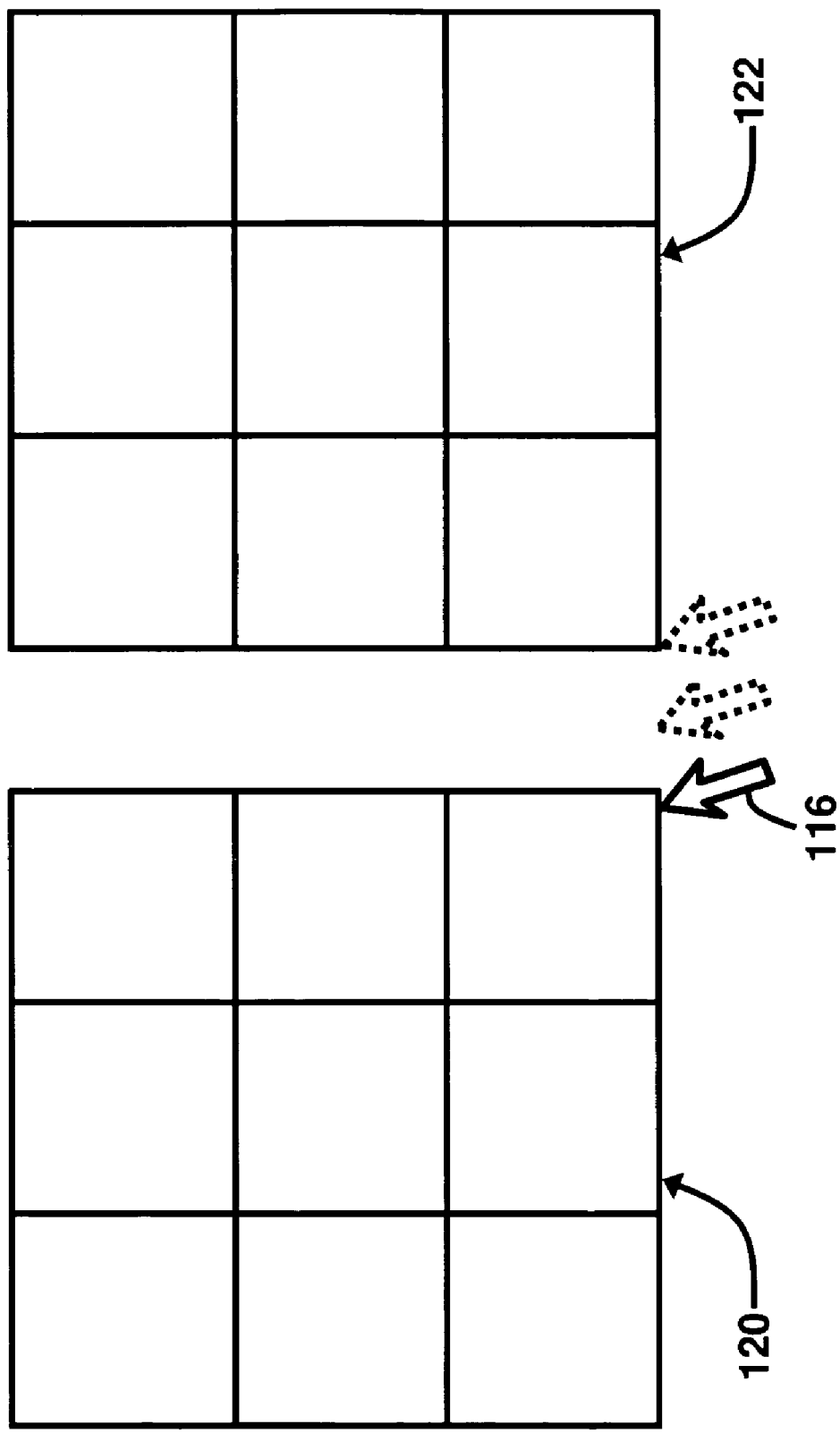
FIG. 1(C) is a schematic diagram of pixel configurations according to an embodiment of the invention.

As shown in FIG. 1(C), the system 100 further comprises a pointer 116 adapted to select a group of contiguous original pixels 120 in the original single motion frame and to select a corresponding group of contiguous received pixels 122 in the received single motion frame, wherein the comparator 114 is adapted to compare the selected group of contiguous original pixels 120 in the original single motion frame with the selected corresponding group of contiguous received pixels 122 in the received single motion frame. The pointer 116 may be embodied as a mouse pointer and can freely move (as indicated by the dotted pointer representations in FIG. 1(C)), for example on the receiver 104. As illustrated in FIG. 1(C), the group of contiguous original pixels 120 comprises a group of nine contiguous original pixels 120 arranged in a 3×3 square configuration, and wherein the corresponding group of contiguous received pixels 122 comprises a group of nine contiguous original pixels 122 arranged in a 3×3 square configuration.

The first component, which constitutes the overall transmission quality score (objective score) according to an embodiment of the invention is the size of the video window. The size of the video window is significant in order to achieve an end result of displaying the video content in a full screen. The smaller the video window, the harder it is for the video decoder device to display the content with intelligibility. Table 1 illustrates the individual score for the pixel measurement component of the overall transmission quality score value.

TABLE 1

Transmission Quality Score Value for Different Video Sizes

| Video Window Size | Pixels | % Value | Score |
|---|---|---|---|
| 1440 × 720 | 1036800 | 12.27 | 307 |
| 720 × 480 | 345600 | 4.09 | 102 |
| 352 × 288 | 101376 | 1.20 | 30 |
| 352 × 240 | 84480 | 1.00 | 25 |
| 320 × 240 | 76800 | 0.91 | 23* |
| 240 × 180 | 43200 | 0.51 | 13 |
| 176 × 144 | 25344 | 0.30 | 8 |
| 160 × 120 | 19200 | 0.23 | 6 |

For example, for an original 352×240 video file (considered to be normal), the number of frames displayed during a given second of time establishes the video contents ability to appear fluid or smooth in motion. The larger the frame size the more apparent this becomes. Thus, according to Table 1, the % Value equals the number of Pixels divided by 84480 pixels (corresponds to the 352×240 original screen size). Furthermore, the Score equals the % Value times 25 (rounded up to the nearest whole number). For example, the % Value for a 1440×720 video window screen is calculated by: 1036800 divided by 84480, which equals 12.27. Hence, the Score for a 1440×720 video window screen is calculated by: 12.27 multiplied by 25, which equals 307 (rounded up to the nearest whole number).

The second key element, the frames per second (FPS) measurement measures the original source frame rate to be compared later on a display device. The frame rate of the receiving device may change due to several factors lowering the score such as display device (DVD0 speed, display device CPU issues, transport issues, new re-encoding of the video file, etc. A frame rate count is a count of all the frames that can be displayed in a single second of time. These frames are then documented for comparison. Table 2 illustrates the individual score for the frames per second measurement of the overall transmission quality score value.

TABLE 2

Transmission Quality Score Value for Different Motion Types

| Motion type | FPS | % Value | Score |
|---|---|---|---|
| Full | 25 | 1.00 | 30* |
| High Medium | 20 | 0.80 | 24 |

TABLE 2-continued

Transmission Quality Score Value for Different Motion Types

| Motion type | FPS | % Value | Score |
|---|---|---|---|
| Medium | 15 | 0.60 | 18 |
| Low Medium | 12 | 0.48 | 14 |
| High Low | 10 | 0.40 | 12 |
| Low | 8 | 0.32 | 10 |
| Very Low | 7 | 0.28 | 8 |
| Ultra Low | 4 | 0.16 | 5 |

According to Table 2, the % Value equals the FPS divided by 25. Here, a full motion type frame rate is considered normal. The Score equals the % Value times 30. For example, for a "High Low" frame rate motion type, the % Value is calculated as: 10 divided by 25, which equals 0.40. Thus, the Score for a "High Low" frame rate motion type is calculated as: 0.40 multiplied by 30, which equals 12.

The clarity of video content aids in truly estimating the video intelligibility. The clarity also is significant in that it may be used as the only medium of transferring information such as text. In some cases, such as training presentations, the speaker may provide verbal comments for some, but not all, text. This can leave the viewer without a way of retrieving the added information. For cases like these, a video clarity rating is major factor in establishing a proper content score.

Measuring the clarity value is performed by comparing the original video content against the created encoded content. A single motion frame of each is required. By simply enlarging the video flame of both the original and the encoded video until each pixel can be seen, a one for one comparison can be made. Any nine grouped pixels in a frame can be selected for comparison; a 3×3 square. Each pixel is individually compared in the grouping for the same color per pixel. Table 3 illustrates the individual score for the clarity component of the overall transmission quality score value.

TABLE 3

Transmission Quality Score Value for Different Clarity Types

| Clarity | Pixels Comparison | % Value | Score |
|---|---|---|---|
| Very High Clarity | 9 of 9 | 1.0 | 40 |
| Medium High Clarity | 8 of 9 | 0.9 | 36 |
| High Clarity | 7 of 9 | 0.8 | 32 |
| High Medium Clarity | 6 of 9 | 0.7 | 28* |
| Medium Clarity | 5 of 9 | 0.6 | 24 |
| Low Medium Clarity | 4 of 9 | 0.4 | 16 |
| High Low Clarity | 3 of 9 | 0.3 | 12 |
| Low Clarity | 2 of 9 | 0.2 | 8 |
| Very Low Clarity | 1 of 9 | 0.1 | 4 |

According to Table 3, the % Value equals the Pixels Comparison value divided by 9. Here, high medium clarity is considered normal. The Score equals the % Value times 40. For example, for a "High" clarity, the % Value is calculated as: 7 divided by 9, which equals 0.8 (rounded up to the nearest tenth). Thus, the Score for a "High" clarity is calculated as: 0.8 multiplied by 40, which equals 32.

The color rating element is an added value to prevent the decoding device from distorting the original content due to a color conversion. In most cases, the color rating will be derived as part of the clarity score. However, in cases where the measuring decoder system only has the ability to display 16M or 24M colors, the clarity score will be erroneous until after it is displayed on a higher resolution display. At that point, the clarity measurements will be apparent. Table 4 illustrates the individual score for the color rating component of the overall transmission quality score value.

TABLE 4

Transmission Quality Score Value for Different Color Ratings

| Colors | % Value | Score |
|---|---|---|
| 32M | 1.00 | 5* |
| 24M | 0.75 | 4 |
| 16M | 0.50 | 3 |

According to Table 4, the % Value equals the Color value divided by 32M. Here, 32M is considered normal. The Score equals the % Value times 5. For example, for "24M", the % Value is calculated as: 24M divided by 32M, which equals 0.75. Thus, the Score for "24M" is calculated as: 0.75 multiplied by 5, which equals 4 (rounded up to the nearest whole number).

The overall transmission quality score value is based on a perfect score of 100 for a video file that has a 352×240 aspect ratio and is transmitted or retrieved at an average rate of 0.300 MPS (mega bits per second). By adding the various score values for each of the components (pixels, FPS, clarity, and color elements) and then dividing this value by the transmission rate, an overall transmission quality % Value can be obtained. Then, the Score can be calculated as: 100 plus (% Value minus 77). Table 5 illustrates how the overall transmission quality score value is obtained for a normal transmission.

TABLE 5

Overall Transmission Quality Score Value

| Pixels | FPS | Clarity | Colors | MBPS | % Value | Score |
|---|---|---|---|---|---|---|
| 23 | 30 | 28 | 5 | 0.300 | 66 | 89 |

According to Table 5, the % Value equals the sum of the pixels, FPS, clarity, and color values (for normal transmissions) divided by one plus the MBPS. The Score equals 100 plus the sum of % Value minus 77. For example, for a normal transmission, the % Value is calculated as: (23+30+28+5) divided by (1.000+0.300), which equals 66 (rounded up to the nearest whole number). Thus, the Score for a normal transmission is calculated as: 66 minus 77, which equals −11 plus 100, which equals 89 (rounded up to the nearest whole number).

FIG. 2, with reference to FIGS. 1(A) through 1(C), depicts flow diagram illustrating a method of measuring video quality, wherein the method comprises duplicating (201) a video image from a source device 102 to a receiver 104; comparing (203) display attributes of a received video image displayed by the receiver 104 with creation attributes of an original video image created by the source device 102; and attributing (205) an objective standard to the received video image based on the comparison between the display attributes and the creation attributes, wherein in the attributing process (205), the objective standard comprises a video pixel size component, a video motion rating component, a video clarity rating component, and a pixel color rating component.

The comparing process (203) comprises creating an original single motion frame comprises original pixels 120 for the original video image; creating a received single motion frame comprises received pixels 122 for the received video image; and comparing the original single motion frame with the received single motion frame. The method further comprises selecting a group of contiguous original pixels 120 in the original single motion frame; selecting a corresponding group of contiguous received pixels 122 in the received single motion frame; and comparing the selected group of contiguous original pixels 120 in the original single motion frame with the selected corresponding group of contiguous received pixels 122 in the received single motion frame, wherein the group of contiguous original pixels 120 comprise a group of nine contiguous original pixels arranged in a 3×3 square configuration, and wherein the corresponding group of contiguous received pixels 122 comprise a group of nine contiguous original pixels arranged in a 3×3 square configuration. The method also comprises comparing a color of the original pixels 120 with a color of a corresponding the received pixels 122.

Figure 3:
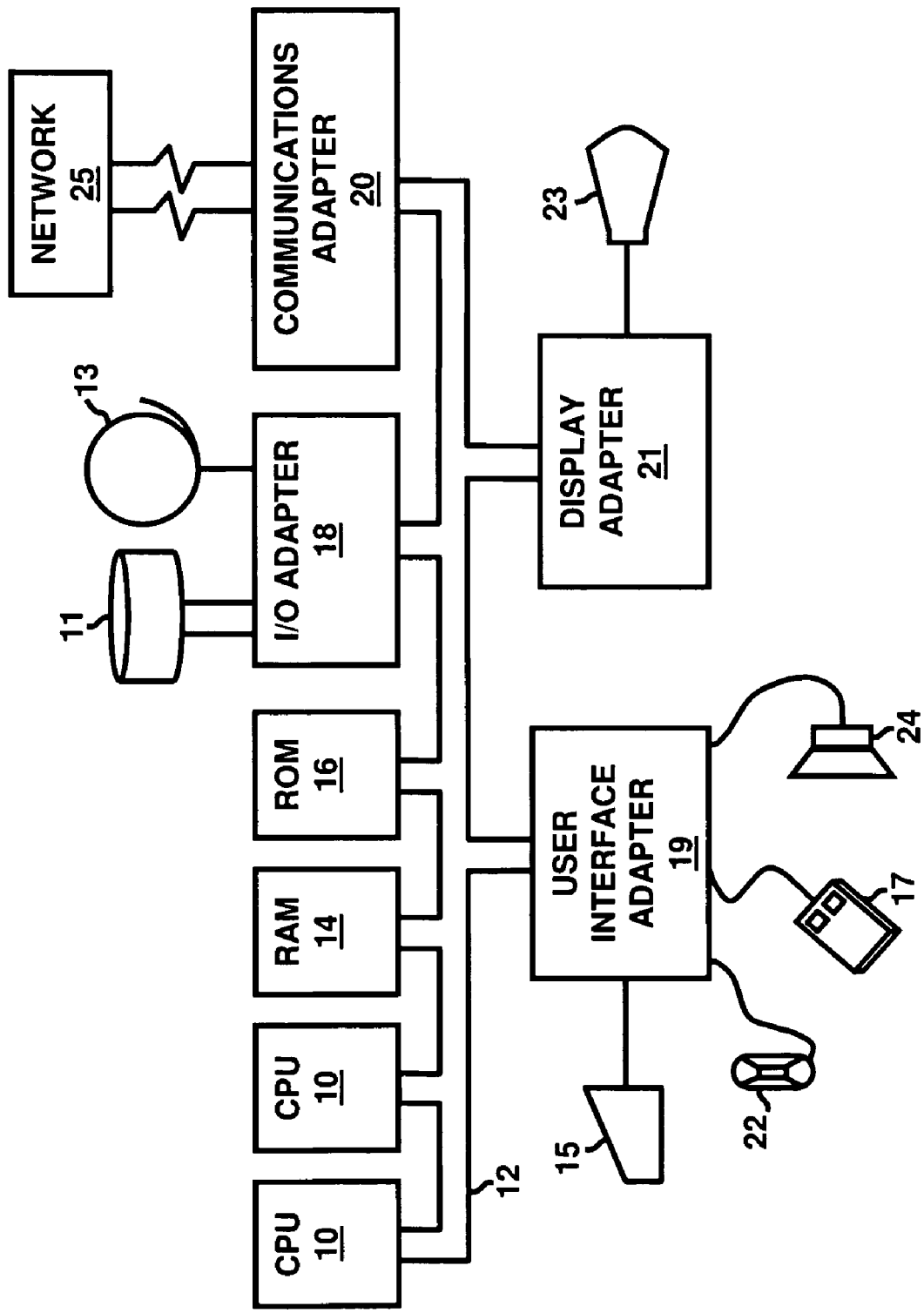
FIG. 3 is a schematic diagram of a computer system according to an embodiment of the invention.

A representative hardware environment for practicing the embodiments of the invention is depicted in FIG. 3. This schematic drawing illustrates a hardware configuration of an information handling/computer system in accordance with the embodiments of the invention. The system comprises at least one processor or central processing unit (CPU) 10. The CPUs 10 are interconnected via system bus 12 to various devices such as a random access memory (RAM) 14, read-only memory (ROM) 16, and an input/output (I/O) adapter 18. The I/O adapter 18 can connect to peripheral devices, such as disk units 11 and tape drives 13, or other program storage devices that are readable by the system. The system can read the inventive instructions on the program storage devices and follow these instructions to execute the methodology of the embodiments of the invention. The system further includes a user interface adapter 19 that connects a keyboard 15, mouse 17, speaker 24, microphone 22, and/or other user interface devices such as a touch screen device (not shown) to the bus 12 to gather user input. Additionally, a communication adapter 20 connects the bus 12 to a data processing network 25, and a display adapter 21 connects the bus 12 to a display device 23 which may be embodied as an output device such as a monitor, printer, or transmitter, for example.

Generally, it is best to measure the initial quality of a video signal and then compare that signal to what is actually being provided to the users from a visual perspective. As previously indicated, conventional methods generally measure transport quality and assume that if data packets are delivered, then all is well (i.e., if the data packets were delivered successfully, then the video signal must be fine). However, the embodiments of the invention do not assume such a broad characterization, and as such measures key elements in the video signal to ensure that the best representation of the original video image is being displayed by the received (and displayed) video signal. By doing so, the measurement provided by the embodiments of the invention can be used for "any" measurement of video quality, whether it is broadcasted, resident displayed, or re-manufactured for video compression.

The foregoing description of the specific embodiments will so fully reveal the general nature of the invention that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the invention has been described in terms of preferred embodiments, those skilled in the art will recognize that the embodiments of the invention can be practiced with modification within the spirit and scope of the appended claims.

What is claimed is:

1. A method of measuring video quality, said method comprising:
   duplicating a video image from a source device to a receiver;
   comparing display attributes of a received video image displayed by said receiver with creation attributes of an original video image created by said source device; and
   attributing an objective standard to said received video image based on the comparison between said display attributes and said creation attributes,
   wherein in the attributing process, said objective standard comprises a video pixel size component, a video motion rating component, a video clarity rating component, and a pixel color rating component.

2. The method according to claim 1, wherein in the duplicating process, said receiver comprises a display console.

3. The method according to claim 1, wherein the comparing process comprises:
   creating an original single motion frame comprising original pixels for said original video image;
   creating a received single motion frame comprising received pixels for said received video image; and
   comparing said original single motion frame with said received single motion frame.

4. The method according to claim 3, further comprising:
   selecting a group of contiguous original pixels in said original single motion frame;
   selecting a corresponding group of contiguous received pixels in said received single motion frame; and
   comparing said selected group of contiguous original pixels in said original single motion frame with said selected corresponding group of contiguous received pixels in said received single motion frame.

5. The method according to claim 3, further comprising comparing a color of said original pixels with a color of a corresponding said received pixels.

6. The method according to claim 4, wherein said group of contiguous original pixels comprise a group of nine contiguous original pixels arranged in a 3×3 square configuration, and wherein said corresponding group of contiguous received pixels comprise a group of nine contiguous original pixels arranged in a 3×3 square configuration.

* * * * *